(12) United States Patent
Cortequisse

(10) Patent No.: US 9,951,654 B2
(45) Date of Patent: Apr. 24, 2018

(54) STATOR BLADE SECTOR FOR AN AXIAL TURBOMACHINE WITH A DUAL MEANS OF FIXING

(71) Applicant: Techspace Aero S.A., Herstal (Milmort) (BE)

(72) Inventor: Jean-François Cortequisse, Heers (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 697 days.

(21) Appl. No.: 14/322,708

(22) Filed: Jul. 2, 2014

(65) Prior Publication Data

US 2015/0010395 A1 Jan. 8, 2015

(30) Foreign Application Priority Data

Jul. 3, 2013 (EP) .................................... 13174893

(51) Int. Cl.
 *F01D 25/24* (2006.01)
 *F01D 9/04* (2006.01)
 (Continued)

(52) U.S. Cl.
 CPC .......... *F01D 25/246* (2013.01); *F01D 9/041* (2013.01); *F01D 9/042* (2013.01); *F04D 29/542* (2013.01); *F04D 29/644* (2013.01); *F05D 2230/40* (2013.01); *F05D 2300/40* (2013.01); *F05D 2300/603* (2013.01); *F05D 2300/6033* (2013.01); *Y02T 50/672* (2013.01); *Y02T 50/673* (2013.01)

(58) Field of Classification Search
 CPC .......... F01D 25/246; F01D 9/04; F01D 9/041; F01D 9/042
 See application file for complete search history.

(56) References Cited

U.S. PATENT DOCUMENTS 2,772,069 A 11/1956 Hockert et al.
2,801,822 A * 8/1957 Speed ....................... F01D 5/30
 415/209.3
(Continued)

FOREIGN PATENT DOCUMENTS

EP 2213840 A2 8/2010
EP 2339120 A1 6/2011
(Continued)

OTHER PUBLICATIONS

European Search Report dated Nov. 19, 2013 for EP 13174893.1.

*Primary Examiner* — Kenneth Bomberg
*Assistant Examiner* — Hoon Choi
(74) *Attorney, Agent, or Firm* — James E. Walton

(57) ABSTRACT

The present application relates to a stator blade sector configured to be fixed to a housing of an axial turbomachine, the sector having a plurality of blades with platforms juxtaposed, so as to describe an arc of a circle. At least one of the platforms comprises on its outer face a fixing screw and at least one other platform has no fixing screws, the platforms being fixed together at their adjacent edges. The application also relates to a stator or portion of stator having a housing forming a generally circular wall and blade sectors arranged along the wall. The housing includes several parts connected to each other by longitudinal flanges. Platforms with no fixing screws are located opposite the flanges.

8 Claims, 3 Drawing Sheets

(51) Int. Cl.
  *F04D 29/54*  (2006.01)
  *F04D 29/64*  (2006.01)

(56) References Cited

U.S. PATENT DOCUMENTS

| | | | | |
|---|---|---|---|---|
| 2,997,275 A * | 8/1961 | Bean | ........................ | F01D 9/042 |
| | | | | 415/116 |
| 3,617,685 A * | 11/1971 | Brill-Edwards | ... | B23K 15/0006 |
| | | | | 219/118 |
| 7,798,779 B2 * | 9/2010 | Nogami | .................. | F01D 5/147 |
| | | | | 416/220 R |
| 8,017,188 B2 * | 9/2011 | Xie | ......................... | B29B 11/16 |
| | | | | 427/384 |
| 8,092,165 B2 * | 1/2012 | Bouchard | ................. | F01D 9/02 |
| | | | | 29/889.22 |
| 8,511,982 B2 * | 8/2013 | Hart | ........................ | F01D 9/042 |
| | | | | 415/209.2 |
| 9,228,446 B2 * | 1/2016 | Samuelsson | | |
| 9,470,243 B2 * | 10/2016 | Ishigure | ................... | F01D 5/282 |
| 2006/0093847 A1 * | 5/2006 | Hornick | ................ | F01D 21/045 |
| | | | | 428/523 |
| 2008/0206048 A1 * | 8/2008 | Coupe | ..................... | B29C 70/24 |
| | | | | 415/200 |
| 2009/0185899 A1 | 7/2009 | Bouchard et al. | | |
| 2014/0056711 A1 * | 2/2014 | Dezouche | .............. | F01D 9/042 |
| | | | | 416/193 A |

FOREIGN PATENT DOCUMENTS

| | | | | | |
|---|---|---|---|---|---|
| GB | | 600057 A * | 3/1948 | ............... | F01D 5/30 |
| GB | | 644031 A | 10/1950 | | |
| WO | WO 2012121334 A1 * | | 9/2012 | ............. | F01D 5/282 |

* cited by examiner

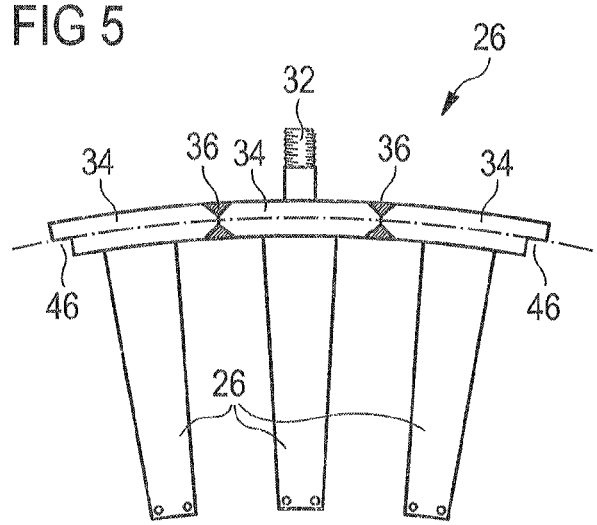
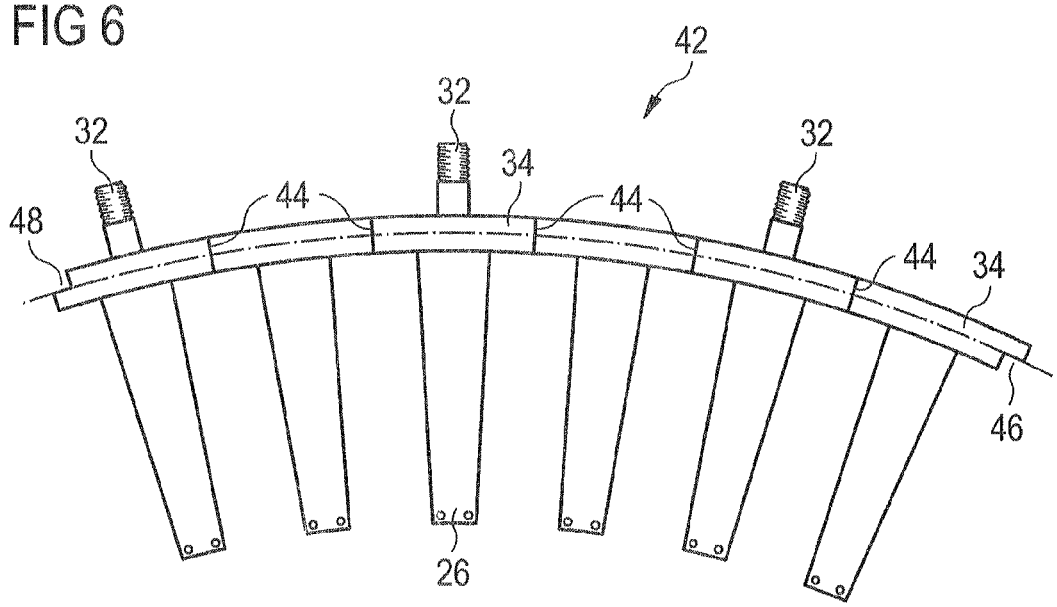

STATOR BLADE SECTOR FOR AN AXIAL TURBOMACHINE WITH A DUAL MEANS OF FIXING

This application claims priority under 35 U.S.C. § 119 to European Patent Application No. 13174893.1, filed 3 Jul. 2013, titled "Stator Blade Sector for an Axial Turbomachine with a Dual Means of Fixing," which is incorporated herein by reference for all purposes.

BACKGROUND

1. Field of the Application

The present application relates to the field of axial turbomachines, such as jet engines, especially turbofan engines. More particularly, the present application relates to bladed stators in such machines. The bladed stator may be on the compressor, or one of the compressors, or the turbine, or one of the turbines on such a machine.

2. Description of Related Art

Published patent EP 2075412 A1 discloses a device for fixing the stator blades to the shell of a compressor stator stage of an axial turbomachine. Each of the blades includes a fixing platform and an airfoil forming the aerodynamic part of the blade. The shell comprises a groove into which the blade platforms are inserted. The platforms comprise a fixing screw or bolt on their outer face. This screw is intended to pass through the wall of the stator shell and mate up with a nut for clamping the blades. This method of attachment requires assembly and adjustment of each individual blade. It thus needs some time to assemble, in particular for large diameter turbomachines with a large number of blades. In addition, the screws are a considerable weight.

Published patent EP 2339120 A1 discloses another device for fixing the stator blades in the shell of a compressor stator stage of an axial turbomachine. The blades are assembled in sectors on the shell. To do this, the central blades in a sector are inserted radially through a segment of a platform and a segment of an inner shell. The blades at the ends of the sector each comprise a platform at each end in a radial direction, the said platforms being screwed to the stator shell and the inner shell. More specifically, the outer platform of one of these blades is common to two adjacent sectors and provides, through its screws, connection to and fixing of external platform segments. The internal platform ensures the connection between two adjacent inner shell segments. This type of installation requires the manufacture and implementation of a number of parts. Furthermore, the end blades are not identical to the central blades. Furthermore, the stiffness of the fixing is limited given that only the end blades provide a rigid connection to the stator shell. Also the existence of an external platform creates added weight.

Published patent GB 2250782 A discloses another device for fixing the stator blades to a shell of a compressor stator stage of an axial turbomachine. The main blades are formed integrally with an outer shell and an inner shell, these latter comprising slots between the blades for inserting intermediate blades. These intermediate blades can thus be made of a composite material, in contrast to the main blades which are made of metallic material. The aim of this teaching is to facilitate the replacement of damaged blades. However, it requires the use of two types of blades, similar to the previous teaching. In addition, the rigidity of the stator stage may be limited given that only the main blades ensure the rigidity of the inner shell and the auxiliary blades via the said shell.

Although great strides have been made in the area of bladed stators for axial turbomachines, many shortcomings remain.

DESCRIPTION OF THE DRAWINGS

FIG. 5 is a plan view of a second example of the blade sector for the stator in FIGS. 2 and 3.

FIG. 6 is a plan view of a third example of the blade sector for the stator in FIGS. 2 and 3.

DETAILED DESCRIPTION OF THE PREFERRED EMBODIMENT

Figure 1:
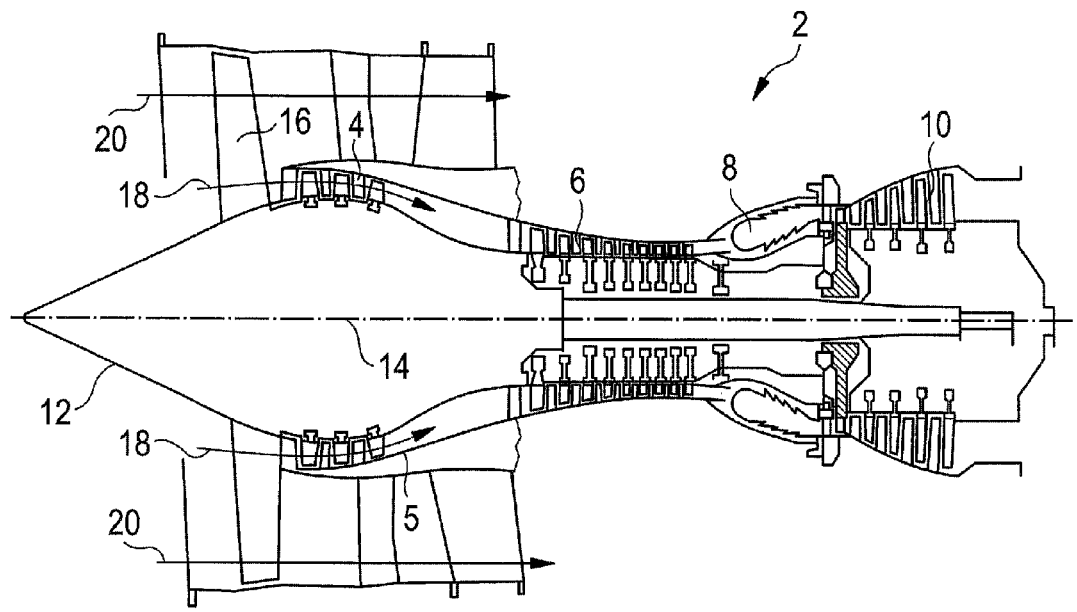
FIG. 1 shows a sectional view of an axial turbomachine according to the present application.

The present application aims to provide a method of fixing stator blades which overcomes at least one of the disadvantages of the state of the art mentioned above. More particularly, the present application aims to provide a method of fixing which provides satisfactory rigidity while being lightweight. More particularly, the present application aims to provide a method of fixing that is compatible with a housing or a housing shell provided with means for fixing the housing or the shell that may interfere with the blade fixing screws.

The present application relates to a stator blade sector intended to be fixed to a housing of an axial turbomachine, the sector comprising a plurality of blades with juxtaposed platforms describing a circular arc, and with an airfoil projecting from the inner face of each platform, the said airfoils being directed towards the centre of the circular arc described by the platforms, wherein at least one platform includes on its outer face a fixing screw and at least another platform is free of fixing screws, the platforms being fixed together at their adjacent edges.

According to an advantageous embodiment of the present application, the sector comprises three blades with a central blade and two lateral blades on either side of the central blade, the platform of the central blade being the platform that has no fixing screws, the two platforms of the lateral blades being the platforms having fixing screws.

According to an advantageous embodiment of the present application, at least one of the edges of the platforms with screws forming one end of the sector includes a shoulder designed to overlap an adjacent edge of an adjacent sector. The end of the sector means in the circumferential direction of the sector.

According to an advantageous embodiment of the present application, the sector comprises three blades with a central blade and two lateral blades on either side of the central blade, the platform of the central blade being the platform having a fixing screw, the two platforms of the lateral blades being the platforms having no fixing screws.

According to an advantageous embodiment of the present application, at least one of the edges of the platforms having no screws forming one end of the sector includes a shoulder designed to be overlapped by an adjacent edge of an adjacent sector. The end of the sector means in the circumferential direction of the sector.

According to an advantageous embodiment of the present application, the sector has an even number of blades, the blades with platforms with fixing screws and the blades with platforms with no screws being arranged alternately along the sector. Preferably, a blade with a platform with a screw is adjacent to a blade with a platform having no screw, and so on.

According to an advantageous embodiment of the present application, the edge of the platform with a fixing screw forming one end of the sector comprises a shoulder designed to overlap an adjacent edge of an adjacent sector and/or the edge of the platform with no fixing screw forming the other end of the sector comprises a shoulder designed to be overlapped by an adjacent edge of an adjacent sector. The end of the sector means in the circumferential direction of the sector.

According to an advantageous embodiment of the present application, the platforms are fixed together by welding and/or brazing.

According to an advantageous embodiment of the present application, the blades comprise at their inner ends means for mechanical fixing to an inner shell, the said means preferably comprising at least one, preferably two holes.

The present application also relates to a stator or portion of a stator of an axial turbomachine, preferably a compressor, comprising a housing forming a generally circular wall and stator blades located in at least one annular row on the inner face of the wall, the blades forming sectors, wherein at least one of the sectors is in accordance with the present application.

According to an advantageous embodiment of the present application, all sectors of the, or at least one of the, blade rows are in accordance with the present application, the said sectors preferably being identical.

According to an advantageous embodiment of the present application, the wall comprises a means of fixing of the said wall on its external face at the, or at least one of the, blade rows, the sectors being designed so that the blades with platforms with no screws are located at the said means.

According to an advantageous embodiment of the present application, the housing wall comprises several parts around its circumference, the said parts comprising at their circumferential ends flanges extending axially designed to mate with each other for fixing the parts of the wall, the blades located at the said flanges being those platforms have no fixing screws.

According to an advantageous embodiment of the present application, the wall is made of a composite material, preferably with an organic matrix and preferably with reinforcing fibres.

The present application also relates to an axial turbomachine comprising a rotor carrying rotor blades and a stator or stator section carrying stator blades, wherein the stator or stator section is in accordance with the present application.

The features of the present application are attractive in that they enable a fixing of satisfactory strength and stiffness to be implemented while limiting the weight of the fixing and facilitating the fixing on a housing having means for connecting its parts on its outside that are likely to interfere with the fixing screws.

In the following description, the terms 'inner' or 'internal' and 'outer' or 'external' refer to a position relative to the axis of rotation of the axial turbomachine.

FIG. 1 shows a simplified view of an axial turbomachine. In this case it is a double-flow turbojet. The turbojet 2 comprises a first compression stage, a so-called low-pressure compressor 4, a second compression stage, a so-called high-pressure compressor 6, a combustion chamber 8 and one or more turbine stages 10. In operation, the mechanical power of the turbine 10 is transmitted through the central shaft to the rotor 12 and drives the two compressors 4 and 6. Reduction mechanisms may increase the speed of rotation transmitted to the compressors. Alternatively, the different turbine stages can each be in communication with the compressor stages through concentric shafts. These latter comprise several rotor blade rows associated with stator blade rows. The rotation of the rotor around its axis of rotation 14 generates a flow of air and gradually compresses it up to the inlet of the combustion chamber 10.

An inlet fan, commonly designated a fan 16, is coupled to the rotor 12 and generates an airflow which is divided into a primary flow 18 passing through the various above-mentioned levels of the turbomachine, and a secondary flow 20 passing through an annular conduit (shown in part) along the length of the machine which then rejoins the main flow at the turbine outlet. The primary flow 18 and secondary flow 20 are annular flows and are channelled through the stator 5 of the turbomachine.

Figure 2:
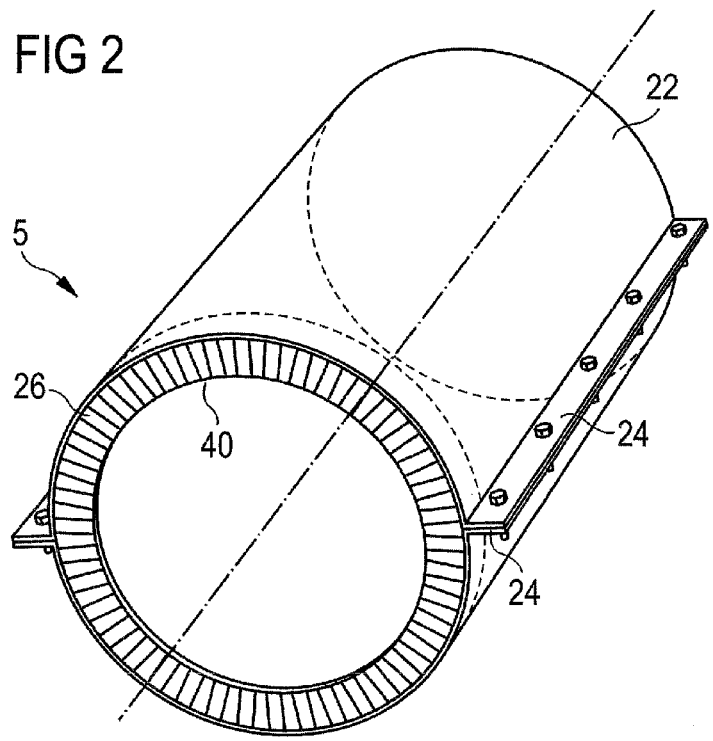
FIG. 2 is a perspective view of the compressor stator of the turbomachine in FIG. 1.

FIG. 2 is a perspective view of the stator 5 of the low-pressure compressor 4 of the turbomachine of FIG. 1. In this case it is a casing of composite material with an organic matrix reinforced with fibres. The stator 5 may comprise a housing 22 which essentially consists of two parts 22 each forming a half-shell. Each of these parts 22 comprises a fixing flange 24 at each of the two circumferential end edges. These fixing flanges extending substantially longitudinally in a direction generally parallel to the axis of rotation of the machine. The advantage of this form of housing construction is that it enables its being assembled around a rotor 12 (FIG. 1) on which the blades are integrally formed with the rotor. This is particularly the case when they are welded to the stubs on the rotor or when they are machined in the bulk of the rotor. When the blades carried by the rotor are integrally formed with the rotor, it is normally not possible to locate the stator around the rotor by sliding it axially as the stator blades which first meet the rotor will strike the first row of rotor blades. Using a housing made up of multiple sector-shaped parts enables an assembly process that is no longer axial but essentially radial and thus avoids problems of interference between the rotor and stator blades.

In FIG. 2 can be seen the first row of stator blades 26 at the inlet of the stator 5 and the corresponding inner shell 40. The housing is shown with the two parts 22 extending along its length. In practice, the housing may comprise several sections in the axial direction. It can thus be formed of several sections forming shells assembled to each other, at least one of these parts being made up of several sector-shaped parts.

Figure 3:
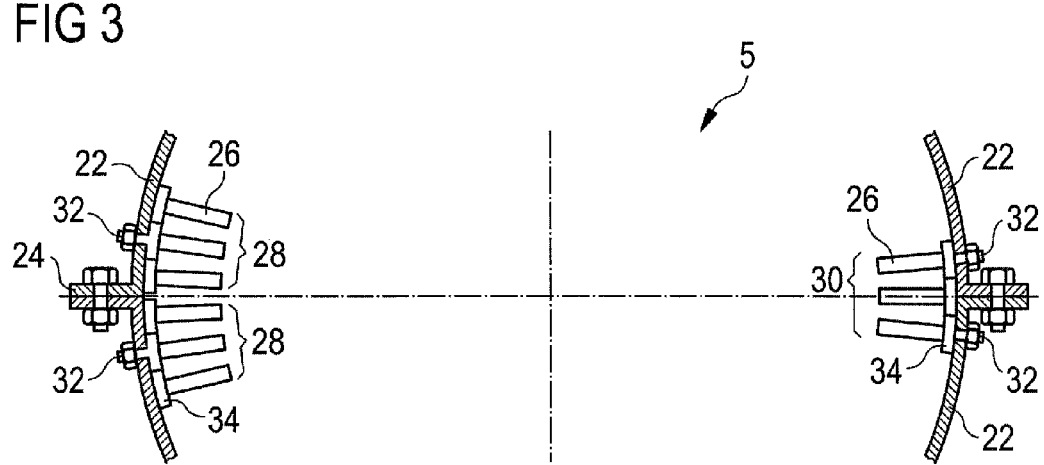
FIG. 3 is a cross-sectional view of the stator in FIG. 2.

FIG. 3 is a cross-sectional view of the housing 22 of FIG. 2, sectioned at a row of stator blades. Only those parts of the housing adjacent to the mounting flanges 24 are shown.

On the left can be seen two sectors 28 each of three blades 26 at the connecting flanges 24 of the parts 22 of the housing, each located on either side of the junction between the two parts of the wall. Each of the two sectors comprises a fixing screw 32 on the platform 34 of the central blade, the platforms of the two lateral blades having no fixing screws. The platforms are rigidly connected together, e.g. by welding or brazing. Such a configuration allows, on the one hand, weight to be saved by reducing the number of fixing screws from three to two and, secondly, by avoiding problems of accessibility and reduced space for the blade fixing screws which are located at the fixing flanges 24.

The remainder of the blade row can be implemented by locating blade sectors 28 end-to-end. However, other sector configurations are possible.

The right hand side of FIG. 3 shows an alternative configuration to that on the left. A segment 30 of three blades 26 is located straddling the junction between the two parts 22 of the wall. The blade platforms 34 are rigidly connected to each other in a similar way to the sectors 28 on the left hand side of the figure, for example by welding or brazing. In the case of sector 30, the platform of the central blade has no fixing screws while those of the lateral blades each have a fixing screw 32. In a similar way to the configuration on the left hand side of the figure, this configuration enables, firstly, weight to be saved, by reducing the number of fixing screws from three to one and, secondly, problems of accessibility and reduced space to be avoided for the blade fixing screw which is located at the fixing flanges 24.

The remainder of the blade row can be implemented by locating blade sectors 30 end-to-end or by alternating a sector 28 and a sector 30. However, other sector configurations are possible.

During assembly of the stator 5, the sectors are first attached to each of the parts 22, the latter then being joined to each other around the rotor of the turbomachine. In the case of the left hand side configuration on the figure, the end edges of the segments are flush with the corresponding edges of the parts of the wall 22. In the case of the right hand side configuration of FIG. 3, sector 30, designed to overlap the junction between the two parts 22 of the wall, is fixed to one of the parts and a portion of the sector projects from the part of the wall in question. Upon assembly of the two parts 22 of the wall, the projecting part of the sector is then positioned against the corresponding inner face of the other part of the wall. A combination of closing movements in a direction substantially perpendicular to the planes of the flanges 24 and along a direction substantially parallel to the said planes may be necessary to allow insertion of the fixing screw on the projecting part of the sector into the corresponding hole in the other part of the wall.

Figure 4:
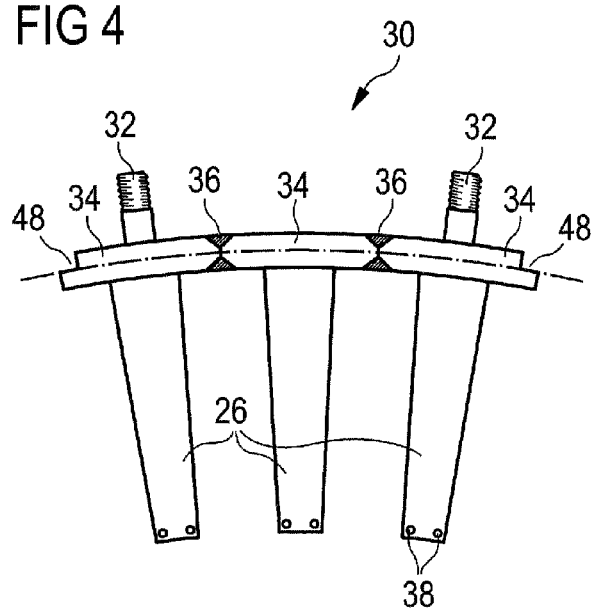
FIG. 4 is a plan view of a first example of the blade sector for the stator in FIGS. 2 and 3.

FIG. 4 illustrates in somewhat greater detail sector 30 in FIG. 3. The rigid connection between the platforms 34 is shown by welds 36 to both sides of the platforms, that is to say the internal and external faces. It is interesting to note that the inner ends of the airfoils of the blades 26 may include mechanical means for fixing to an inner shell (see FIG. 2, reference 40), which means can be holes 38.

Note that the end edges of the sector 30 may have a shoulder 48 designed to form a slot with the inner side of the wall of the housing. These housings are then able to mate with the corresponding adjacent edges of adjacent sectors, especially when they correspond to sector 28.

FIG. 5 illustrates in somewhat greater detail sector 28 in FIG. 3. The rigid connection between the platforms 34 is shown by welds 36 to both sides of the platforms corresponding to the internal and external faces.

The end edges of the sector comprise shoulders 46 forming a cavity open towards the axis of rotation of the machine. These shoulders 46 may mate with the corresponding shoulders 48 of sector 30 (FIG. 4). When these sectors are arranged alternately, the fixing screws at the ends of sector 30 guarantee secure fixing for those platforms which have no fixing screws by means of the pressure forces exerted by the platform shoulders on the two ends of sector 28.

FIG. 6 shows a third example of a sector 42 of blades. It consists of six blades with alternately arranged platforms, i.e. along the curved profile of the sector, platforms with screws and platforms without screws alternate in succession.

The rigid connection between the platforms 34 is represented by the brazing 44 between the contact faces of the platforms.

The end edges can have shoulders 46 and 48, similarly to those in FIGS. 4 and 5. The sectors 42 can be arranged end-to-end along the circular profile of the inner face of the wall of the housing, the shoulder 48 of each sector being put in place to mate with the shoulder 46 of the sector already in place.

Sector 42 of FIG. 6 can have a different number of blades, such as two, four or eight blades. It comprises an even number of blades, these being arranged alternately, namely one with a screw being followed by another with no fixing screw, and so on.

The blades, particularly the platforms, the aerodynamic airfoils and the fixing screws are, in general, made of a metallic material, preferably titanium.

I claim:

1. A portion of a stator of a compressor, comprising;
    a housing forming a generally circular wll; and
    stator blades located in at least one annular row on an inner face of the wall, the blades forming sectors;
    wherein at least one of the sectors comprises:
    a plurality of blades with platforms juxtaposed, so as to describe an arc of a circle, and with an airfoil projecting from an inner face of each platform and directed towards a center of the circular arc described by the platforms;
    wherein at least one of the platforms comprises:
    a fixing screw on an outer face thereof and at least one other platform having no fixing screws, the platforms being welded together at their adjacent edges over their whole radial thicknesses,
    and wherein the housing wall comprises:
    several parts around the circumference thereof, the parts having at the circumferential ends-thereof flanges extending axially so as to mate with each other for fixing the parts of the wall, the blades located at the flanges being those with platforms that have no fixing screws.

2. The portion of a stator of a compressor in accordance with claim 1, wherein all sectors of the blade rows are identical.

3. The portion of a stator of a compressor in accordance with claim 1, wherein some of the sectors of the blade rows are identical.

4. The portion of a stator of a compressor in accordance with claim 1, wherein the wall comprises:
    on an outer face thereof, a means of fixing of the wall on an external face thereof at the blade rows, the sectors being configured so that the blades with platforms, with no screws are located at the means of fixing.

5. The portion of a stator of a compressor in accordance with claim 1, wherein the wall comprises:
    on an outer face thereof, a means of fixing of the wall on an external face thereof at, atleast one of the blade rows, the sectors being configured so that the blades with platforms with no screws are located at the said means.

6. The portion of a stator of a compressor in accordance with claim 1, wherein the wall is made of a composite material.

7. The portion of a stator of a compressor in accordance with claim 1, wherein the wall is made of a composite material with an organic matrix.

8. The portion of a stator of a compressor in accordance with claim 1, wherein the wall is made of a composite material with an organic matrix and fibers.

* * * * *